United States Patent
Czysz

(10) Patent No.: US 7,104,375 B2
(45) Date of Patent: Sep. 12, 2006

(54) VEHICLE WITH SEPARATE GEARBOX CLUTCH AND BACK-TORQUE-LIMITING SLIPPER CLUTCH

(75) Inventor: Michael Czysz, Portland, OR (US)

(73) Assignee: MotoCzysz LLC, Portland, OR (US)

( * ) Notice: Subject to any disclaimer, the term of this patent is extended or adjusted under 35 U.S.C. 154(b) by 0 days.

(21) Appl. No.: 10/633,296

(22) Filed: Jul. 31, 2003

(65) Prior Publication Data
US 2005/0026737 A1 Feb. 3, 2005

(51) Int. Cl.
*B60K 17/00* (2006.01)

(52) U.S. Cl. ............... 192/48.92; 192/56.6; 180/345; 180/374

(58) Field of Classification Search ............... 192/48.3, 192/48.92, 55.1, 56.6; 180/219, 220, 230, 180/65.7, 345, 374, 383
See application file for complete search history.

(56) References Cited

U.S. PATENT DOCUMENTS

| | | | |
|---|---|---|---|
| 1,158,555 A * | 11/1915 | Prescott | 192/48.3 |
| 4,185,723 A * | 1/1980 | Kelbel | 192/36 |
| 4,425,989 A * | 1/1984 | Gotoda | 192/48.92 |
| 4,848,507 A * | 7/1989 | Masuda et al. | 180/248 |
| 4,905,787 A * | 3/1990 | Morin | 180/209 |
| 5,139,124 A * | 8/1992 | Friedmann | 192/48.3 |
| 5,501,310 A * | 3/1996 | Kajitani et al. | 192/48.3 |
| 6,554,113 B1 * | 4/2003 | Li et al. | 192/48.92 |
| 6,564,663 B1 * | 5/2003 | Rioux et al. | 74/336 R |
| 2003/0085096 A1 * | 5/2003 | Drussel et al. | 192/105 B |
| 2005/0139407 A1 * | 6/2005 | Czysz | 180/227 |

* cited by examiner

*Primary Examiner*—Saul Rodriguez
(74) *Attorney, Agent, or Firm*—Richard Calderwood

(57) ABSTRACT

A back-torque limiting slipper clutch. An engine including such a slipper clutch separate from its conventional gearbox clutch. A motor vehicle including such an engine having separate slipper clutch and gearbox clutch. A motorcycle having separate slipper clutch and gearbox clutch. The slipper clutch friction stack tension can be altered statically or dynamically. The slipper clutch may include a secondary output shaft which moves the final output to a point not coaxial with the slipper clutch, such as to move the final output to a different vertical height with respect to a swingarm pivot of the motorcycle.

3 Claims, 6 Drawing Sheets

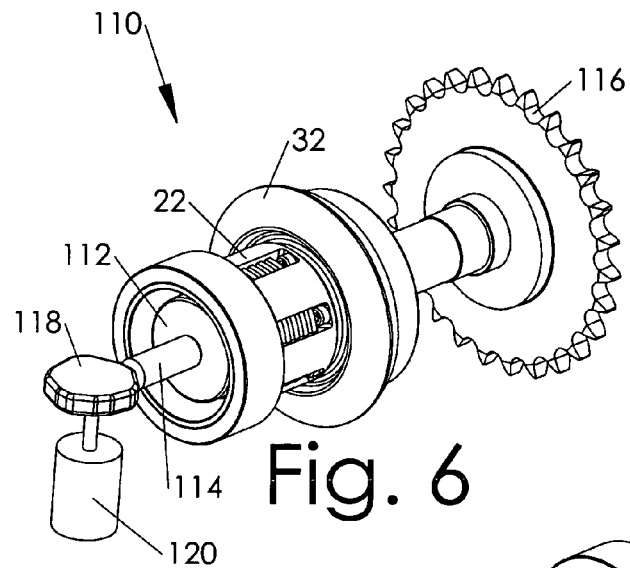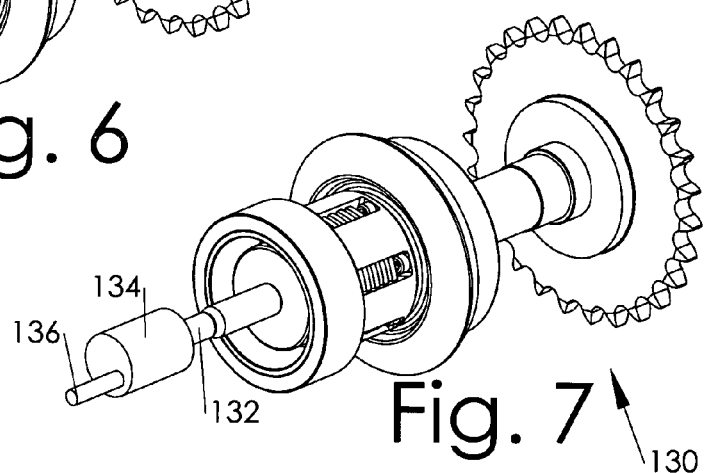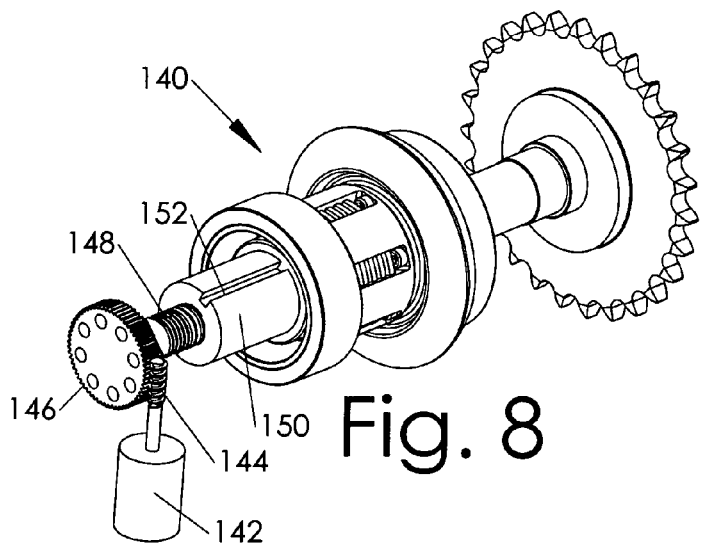

VEHICLE WITH SEPARATE GEARBOX CLUTCH AND BACK-TORQUE-LIMITING SLIPPER CLUTCH

BACKGROUND OF THE INVENTION

1. Technical Field of the Invention

This invention relates generally to a drive train clutch mechanism for a motor vehicles, and more particularly to a motor vehicle having a both a gearbox clutch which performs the conventional coupling and decoupling of the engine from the driven wheels, and a separate slipper clutch which limits back-torque from the driven wheels to the engine such as under deceleration.

2. Background Art

FIG. 1 illustrates an engine 10, which may be an internal combustion engine or, for example, an electric motor. The engine includes a crankcase 12 which encloses one or more crankshafts 13, 15 as well as a gearbox or transmission 17. A cylinder block 14 is coupled to the crankcase, and a head 16 is coupled to the cylinder block. The engine is illustrated as an inline four-cylinder four-stroke engine, may be any suitable engine or motor configuration. In the case of an electric motor, the drive shaft may be considered a crankshaft, and the motor housing may be considered a crankcase.

The engine includes a primary or gearbox clutch 20 which serves to selectively couple and decouple the crankshaft or other drive train component from the final drive output 21 of the engine. In a conventional, transverse-crank motorcycle engine, the gearbox clutch is typically located on a side of the engine. The gearbox clutch typically includes a stack (not shown) of alternating drive plates and friction plates, in which the drive plates interlock with a clutch basket 23 and the stack is kept under compression by a set of clutch basket springs (not shown). A cable or hydraulic actuator mechanism (not shown) relieves the spring compression, allowing the various plates in the stack to rotate and slip on one another, decoupling the crankshaft from the final drive output.

When the engine is throttled up for acceleration, if the clutch is not slipping, the force of the crankshaft is coupled through to the final drive, accelerating the vehicle's driven wheels. However, when the engine is throttled down for deceleration, if the clutch is not slipping, the reduced force on the crankshaft is transmitted through the clutch to the final drive, and the vehicle experiences "engine braking". Engine braking can be a significant force, and not only causes stresses in the drive train components (in a direction opposite to that for which they may have been engineered), but may also reduce the stability of the vehicle or have other negative consequences. This is a well-known problem in certain applications, especially high-compression, large displacement four-stroke racing motorcycles.

In racing applications, it is often desirable to limit the effects of engine braking, to reduce engine stress and to improve rideability and control. Many motorcycles are equipped with back-torque-limiting "slipper clutches" which include a sprag bearing which locks up in one rotational direction but freewheels in the other direction. It is generally not desirable to entirely eliminate engine braking. Most slipper clutches have, in addition to their sprag, a controlled and sometimes statically adjustable amount of clutch friction applied in the freewheel direction, to provide some amount of engine braking.

Unfortunately, the gearbox clutch is subjected to very high stress and temperature during vigorous operation, such as in racing conditions. The stress and temperature degrade the performance and predictability of the slipper function. In the 2002 MotoGP racing season, several riders, including Valentino Rossi and Kenny Roberts Jr., were known to have achieved reduced results in certain races specifically because of slipper clutch problems. Clutches are subject to maximum abuse at the starting line, followed by continued hard usage throughout the race. A racer's mechanics may achieve a perfect pre-race adjustment of a rider's slipper clutch, then, over the course of the race, as the clutch wears and is repeatedly heated and cooled, the slipper clutch falls farther and farther out of adjustment. This may have a significant impact on a rider's braking points and confidence.

What is needed, then, is an engine having an improved slipper clutch function, in which the slipper clutch is less affected by the condition of the gearbox clutch function.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIGS. 6–8 show, in perspective view, different embodiments of a slipper clutch having a dynamic back-torque adjustment mechanism.

DETAILED DESCRIPTION

Figure 1:
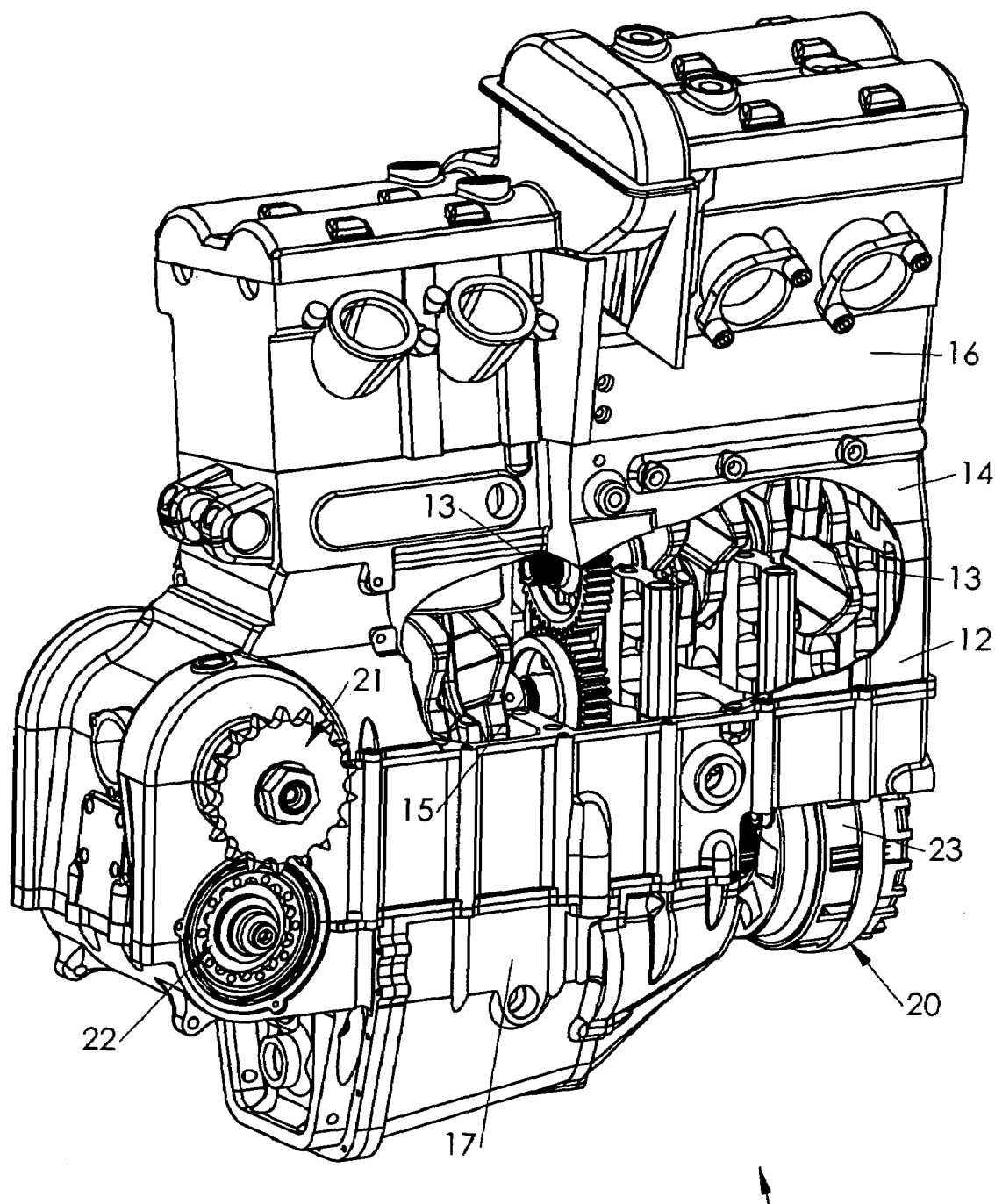
FIG. 1 shows, in perspective view, an engine equipped with both a gearbox clutch and a slipper clutch, according to another embodiment of this invention.

FIG. 1 illustrates an engine 10 according to one embodiment of this invention. The engine includes a crankcase 12 housing one or more crankshafts (not visible), one or more cylinder blocks 14 housing one or more pistons (not visible), one or more heads 16 housing valve trains (not visible), a gearbox 18 housing a gear train (not visible), a gearbox clutch 20 coupled to the gear train, and a separate slipper clutch 22 whose operation is independent of, and, ideally, physically removed from the gearbox clutch. The gearbox clutch provides the conventional function of coupling and decoupling the final drive from the crankshaft, but does not necessarily need to provide a slipper function. In the embodiment shown, the slipper clutch is oriented perpendicular to the crankshaft (not shown). In other embodiments, the slipper clutch may be oriented differently, such as in parallel or even coaxially with the crankshaft.

Figure 2:
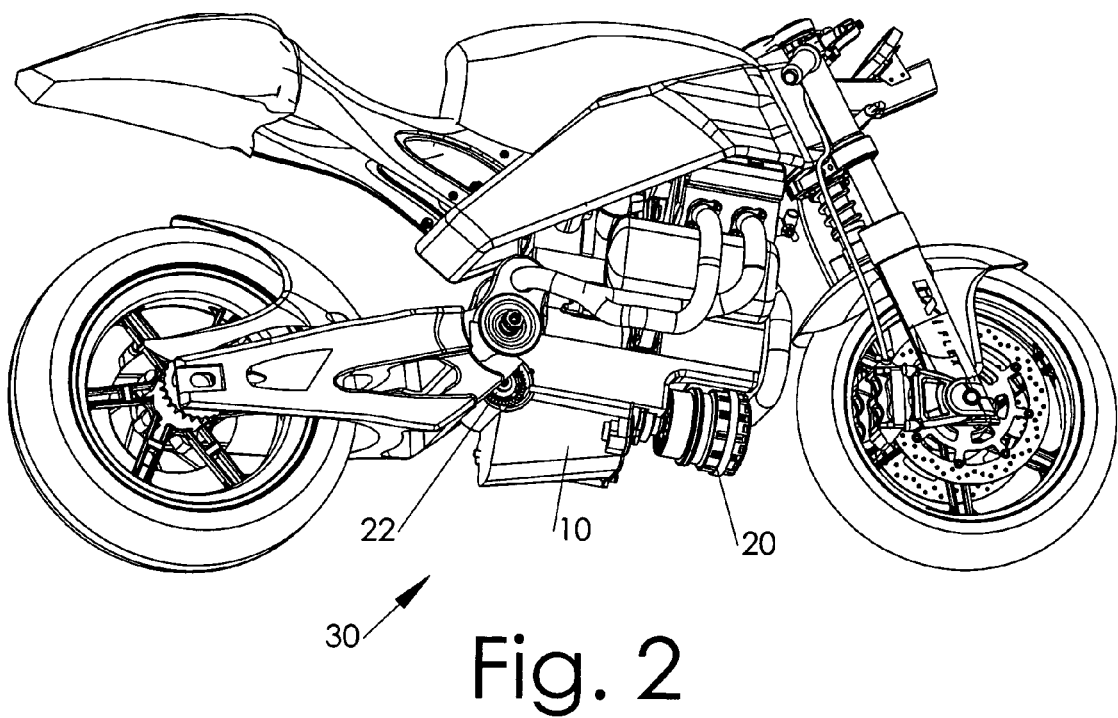
FIG. 2 shows, in perspective view, a motorcycle equipped with both a gearbox clutch and a slipper clutch, according to another embodiment of this invention.

FIG. 2 illustrates one embodiment of a motor vehicle 30 having an engine 10 equipped with both a gearbox clutch 20 and a separate slipper clutch 22, according to this invention. While the invention is illustrated as being embodied in a motorcycle, it may advantageously be used in a wide variety of other applications, such as automobiles, trucks, karts, and so forth. It may also find applicability outside motor vehicles.

Figure 3:
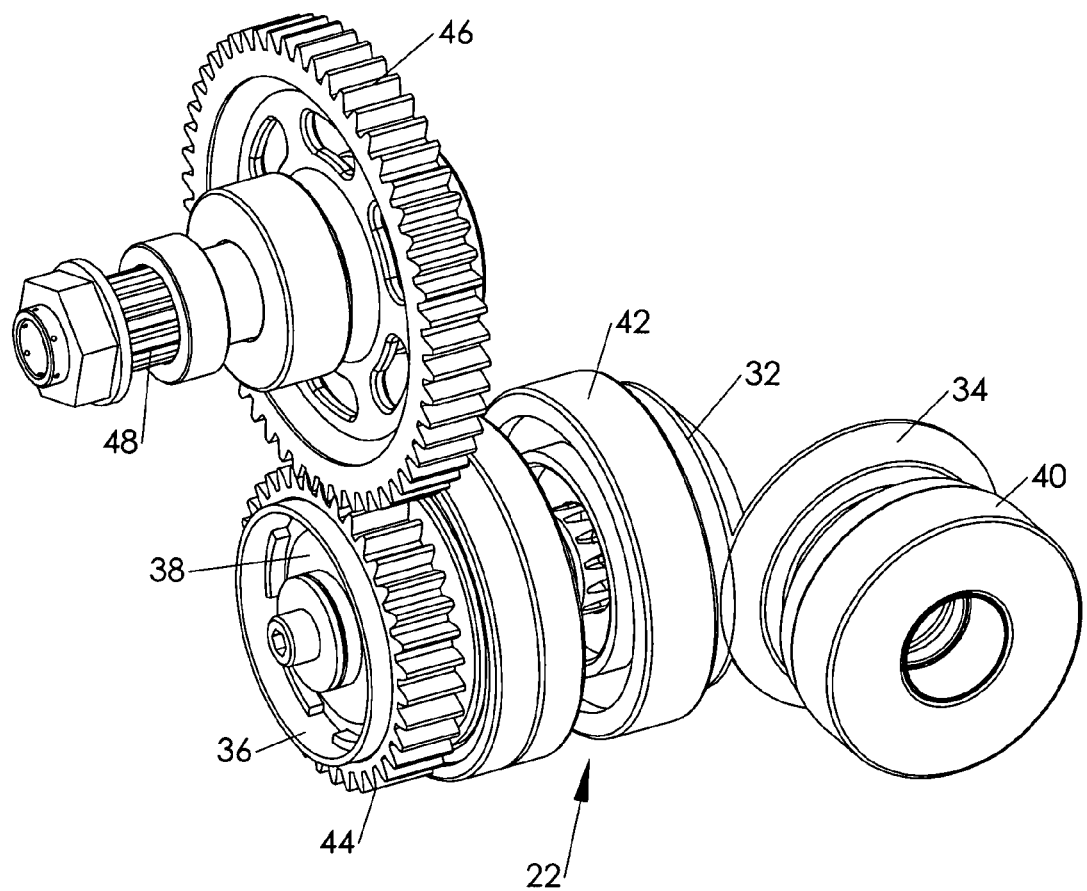
FIGS. 3 and 4 show, in perspective view and exploded view, respectively, a slipper clutch according to one embodiment of this invention.

FIG. 3 illustrates one embodiment of a slipper clutch 22 according to this invention, particularly adapted for use in an engine in which the crankshaft and the final output shaft are perpendicular. In applications in which the slipper clutch is mounted perpendicular to the crankshaft, the slipper clutch is coupled to a bevel gear 32 which is driven by a pinion gear 34. For ease of illustration, the complex-shaped teeth are omitted from the bevel and pinion gears.

The slipper clutch includes a clutch basket 36 which contains a stack of drive plates and friction plates (not visible) which are kept under tension by a spring 38 such as a diaphragm spring. The pinion gear is equipped with a pinion bearing 40, and the bevel gear is equipped with a bearing 42.

In some applications, it may be necessary to move the output axis of the slipper clutch to a different axis (for example in FIG. 2, the final output axis is moved to be concentric with the swingarm pivot) or to reverse the rotation of the output. In such instances, the slipper clutch can be provided with a gear 44 which engages a gear 46 coupled to a second shaft 48. In one embodiment, the gear 44 is integrally formed with the clutch basket.

Figure 4:
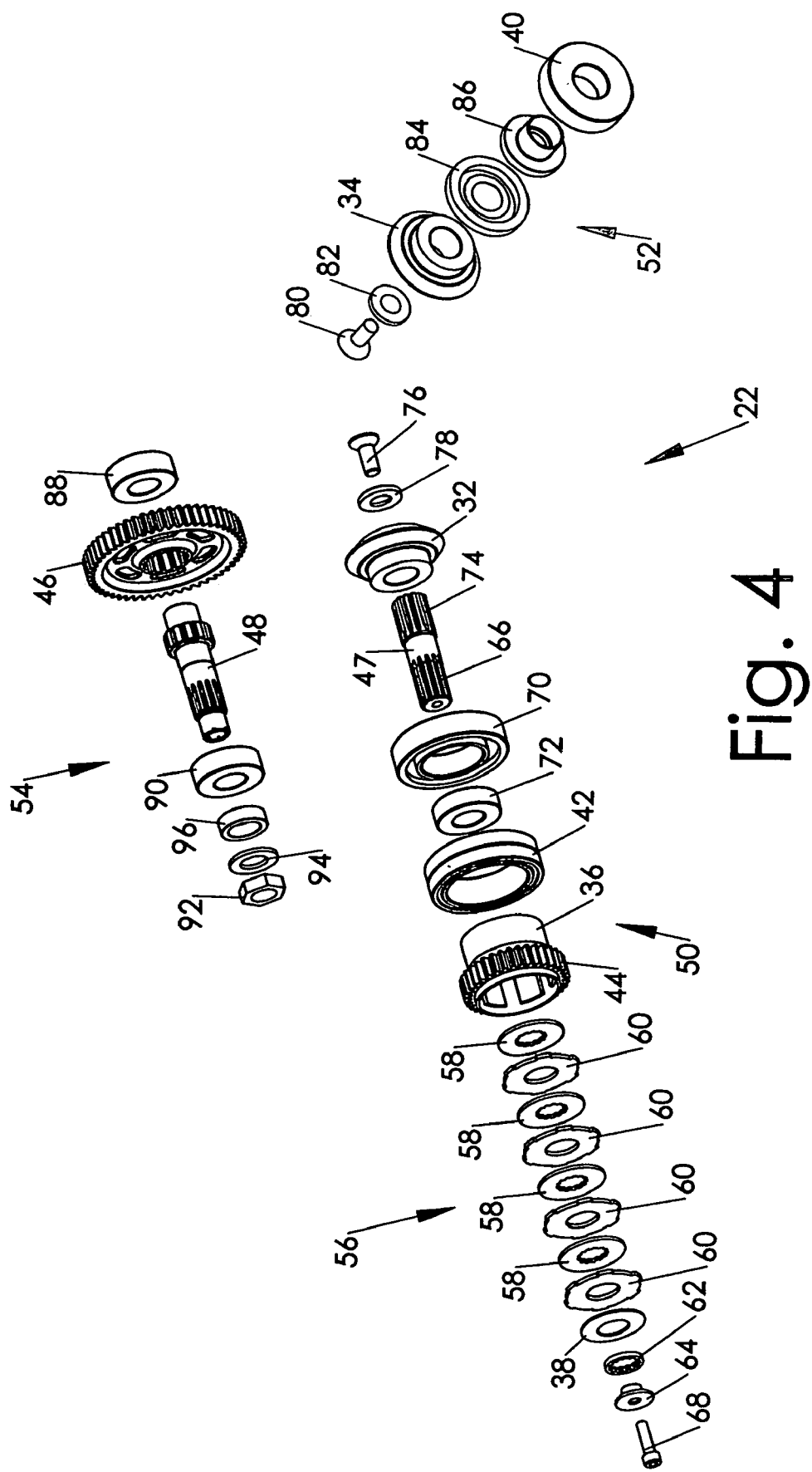

FIG. 4 illustrates further details of the slipper clutch 22 in an exploded view. The slipper clutch includes three basic assemblies: a slipper clutch assembly 50, a pinion assembly 52, and a secondary shaft assembly 54.

The slipper clutch assembly includes the clutch basket 36 with its gear 44. The clutch basket houses a stack 56 of interleaved drive plates 58 and friction plates 60. The stack is kept under pressure by the diaphragm spring 38, according to how tightly or how far an inner nut plate 62 and an outer nut plate 64 are tightened onto splines 66 at one end of the slipper clutch shaft 48 by a tensioner bolt 68. The clutch basket rides in a bearing 42, and the bevel gear rides in a bearing 70. A sprag bearing 72 engages the inner surface of the clutch basket and the outer surface slipper clutch shaft, and provides positive engagement through the slipper clutch in the direction of torque transmitted from the gearbox (not shown) under acceleration, but freewheels in the opposite direction, or the direction in which torque is transmitted from the wheel and driven shaft under deceleration. The bevel gear is coupled to splines 74 at the other end of the slipper. clutch shaft by a bolt 76 and a washer 78.

By tightening and loosening the tensioner bolt, the amount of back-torque transmitted by the slipper clutch can be adjusted. The tensioner is equipped with a tensioner washer.

The pinion assembly 52 couples the slipper clutch to the output drive shaft (not shown) of the engine or other motive mechanism. The pinion gear 34 is coupled to the crankshaft (not shown) or other engine output shaft by a bolt 80 and a washer 82. A spacer 84 and a seal 86 provide a good interface between the pinion gear and a roller bearing 40 which rides in a journal of the crankcase (not shown).

The secondary shaft assembly 54 includes a secondary shaft 48 to which are coupled a gear 46, a pair of bearings 88, 90, and a final drive output sprocket (not shown) which drives the chain (not shown) to transmit power to the rear wheel (not shown). The sprocket is held on by a nut 92 and a washer 94, and is positioned off the outer bearing by a spacer 96.

Referring now to FIGS. 2, 3, and 4 together, the second shaft arrangement can be utilized to significant advantage. The vertical location of the gearbox, and specifically the vertical location of the pinion gear 34 which is coaxial with its side of the gearbox, may not be ideally placed for powering the final drive chain (not shown) which couples the slipper clutch to the rear wheel's sprocket. By appropriately sizing the gears that couple the main and second slipper clutch shafts, and by selecting an angular position of the secondary slipper clutch shaft with respect to the main slipper clutch shaft, the vertical position of the secondary shaft is determined. As illustrated, the secondary shaft (or, stated more directly, the "countershaft sprocket" which drives the chain) can be elevated significantly above the main body of the slipper clutch. This is advantageous for controlling "squat" and other artifacts that are caused by the relative geometries of the drive chain, sprockets, rear axle, and swingarm pivot. In one embodiment, as shown, the secondary slipper clutch shaft can be coaxially located with the swingarm pivot. The secondary shaft can ride in bearings which are coupled to the swingarm and which are coaxial with the swingarm pivot.

Figure 5:
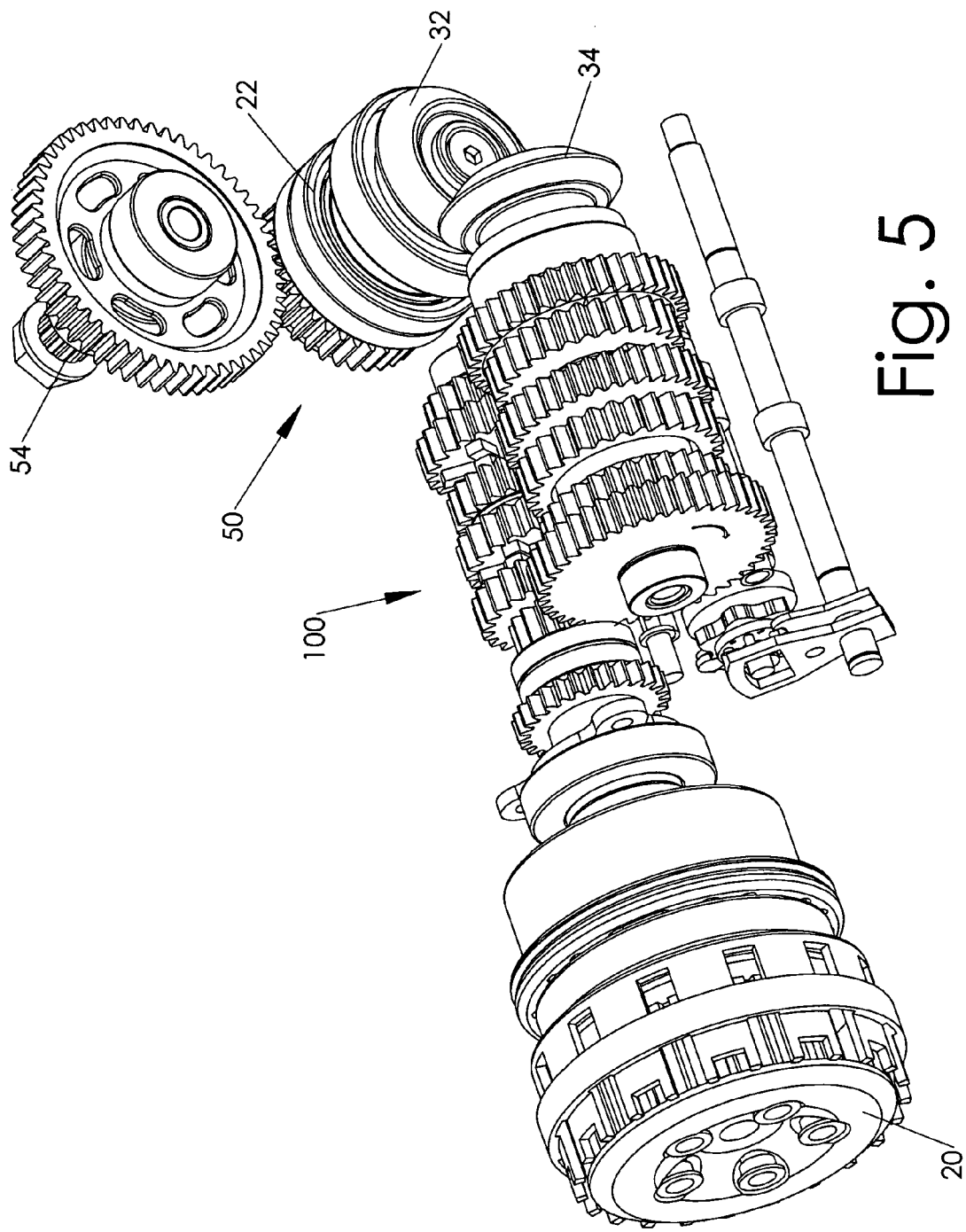
FIG. 5 shows, in perspective view, a motorcycle gearbox equipped with a gearbox clutch and a separate slipper clutch.

FIG. 5 illustrates the gearbox driveline, with crankcases and other components omitted for improved visibility. The driveline includes a gear train 100 which is driven by a gear (not shown) on a crankshaft (not shown) of the engine. The gear train is coupled to and decoupled from the crankshaft torque by the gearbox clutch 20, and drives pinion gear 34. Pinion gear 34 drives bevel gear 32 of the slipper clutch assembly 50. Under acceleration, the slipper clutch's sprag provides positive engagement, and the torque is transmitted to the secondary output shaft assembly 54. Under deceleration, the slipper clutch 22 provides a controlled amount of back-torque from the secondary shaft assembly back into the gear train.

FIG. 6 illustrates another embodiment of a slipper clutch assembly 110 according to this invention. The slipper clutch assembly includes a slipper clutch 22 which is driven by a gear 32, which is driven by an outside motive force (not shown) such as a gear train. The back-torque transmitted by the slipper clutch is determined by the amount of pressure on the plate stack spring (not visible). This slipper clutch is dynamically adjustable, to permit the amount of this pressure to be altered on the fly. A thrust bearing 112 is pressed against the stack spring by a thrust rod 114. There is no secondary shaft, and the output sprocket 116 is directly coupled to the slipper clutch shaft.

In one embodiment, the amount of pressure applied to the thrust bearing by the thrust rod is determined by a cam 118 which is rotated by a stepper motor 120. In one embodiment, the cam has multiple different cam profile faces, each a different distance from the axis of the stepper motor and each thus applying a different amount of pressure through the thrust rod and thrust bearing onto the stack spring. In one embodiment, the cam has six cam profile faces, one for each of the gearbox's six gears which the rider may select. For example, it is often the case at certain racetracks that the rider never engages the gearbox clutch for long while downshifting from sixth gear to fifth gear, or from fifth gear to fourth; sixth gear is rarely used, and when used, it is generally only at the end of a long straightaway, which may be followed by a second-gear corner, in which case the rider stays on the gas until his brake marker, then he rapidly downshifts to second gear while beginning to apply the brakes. In this case, it may be desirable that the cam provide very little back-torque in sixth through third gears, but a significant amount of back-torque in second gear to help the rider slow the motorcycle and back it into the corner. However, it may also be the case that this racetrack has a first-gear chicane, going into which the rider wants very little engine braking; in this case, the cam can provide little pressure to the stack spring in first gear.

The stepper motor may be operated in response to which gear is selected at the gearbox. Or, in other embodiments, the stepper motor may be operated according to different criteria, such as a slipper clutch temperature sensor; as the slipper clutch overheats, the stepper motor may select a cam profile position which changes the amount of back-torque. In another embodiment, the stepper motor may be controlled by the rider, to increase the stack pressure as the friction plates wear over the course of a long race.

FIG. 7 illustrates another embodiment of a slipper clutch system 130 which is dynamically adjustable. Rather than a stepper motor, this embodiment uses a hydraulic piston 132 driven by a hydraulic cylinder 134 in response to pressure from a hydraulic line 136. The hydraulic pressure may be applied automatically under machine control, as with the stepper motor, or it may be operated by a simple mechanism such as a thumb brake.

FIG. 8 illustrates another embodiment of a slipper clutch assembly 140 according to this invention. The slipper clutch is adapted with a motor 142 actuating a worm gear set 144, 146. The worm gear 146 turns a threaded shaft 148 which is engaged with a threaded push rod 150. The pusher is kept from rotating with the shaft by, for example, a keyway 152 engaged with the frame or other structure (not shown) of the vehicle.

In operation, the dynamically adjustable slipper clutch 80 may be adjusted by the rider, or by an automated system (not shown) in the vehicle such as the vehicle's computerized engine controller, or other suitable mechanism. The adjuster may be used only infrequently, such as for periodically compensating for friction plates wearing progressively thinner, slipper clutch temperature, or the like. Or, the adjuster may be used quite frequently, to make on-the-fly alterations in the performance of the slipper clutch. These dynamic adjustments may be made in response to any variety of factors, such as, for example, which gear the motorcycle is in, how fast the motorcycle is traveling, throttle position, racetrack position, slipper clutch temperature, braking force applied by a rider to a brake of the motorcycle, engine rpm, changing fuel load, tire temperature, and so forth. For example, it may be desirable to have lots of engine braking at the end of the front straight, such that the back end of the motorcycle "comes around" and helps the motorcycle turn into a low-speed chicane, but have very little engine braking at the entrance to another corner on the racetrack. In this instance, the dynamic back-torque adjuster will be repetitively increasing and decreasing the tension on the friction stack, lap after lap. Furthermore, as the race progresses and the motorcycle's fuel load comes down, it may be desirable to gradually back off the engine braking a small amount each lap, to compensate for the decreasing mass of the machine. On the other hand, it may be necessary to gradually tighten up the stack, as the friction plates wear or as the stack temperature rises. The slipper clutch may be equipped with a variety of suitable sensors (not shown) for aiding in this methodology, such as a slipper clutch temperature sensor, a connection to the engine or ignition controller for detecting rpm or racetrack position or gear selection, an accelerometer for detecting braking force, and so forth, as well as a manual adjuster switch placed within easy reach of the rider.

CONCLUSION

When one component is said to be "adjacent" another component, it should not be interpreted to mean that there is absolutely nothing between the two components, only that they are in the order indicated. When one component is said to be "coupled to" or "engaged with" another component, it should not necessarily be interpreted to mean that there are no intermediate components between them; coupling and engagement may be direct or indirect.

The various features illustrated in the figures may be combined in many ways, and should not be interpreted as though limited to the specific embodiments in which they were explained and shown.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A motorcycle comprising:
a frame;
an engine coupled to the frame and including a crankshaft and a primary drive output;
a swingarm pivotably coupled to one of the frame and the engine;
a primary clutch coupling the crankshaft to the primary drive output;
a final output shaft coaxial with a swingarm pivot at which the swingarm is coupled to the frame;
a rear wheel rotatably coupled to the swingarm, and coupled to be driven by torque from the final output shaft; and
a slipper clutch coupling the primary drive output to the final output shaft to provide spragged torque transfer from the primary drive output to the rear wheel, and to control back-torque transfer from the rear wheel to the primary drive output by frictional clutch plate slippage.

2. A motorcycle comprising:
a frame;
an engine coupled to the frame and including a crankshaft and a primary drive output;
a swingarm pivotably coupled to one of the frame and the engine;
a primary clutch coupling the crankshaft to the primary drive output;
a final output shaft;
a rear wheel rotatably coupled to the swingarm, and coupled to be driven by torque from the final output shaft;
a slipper clutch coupling the primary drive output to the final output shaft to provide spragged torque transfer from the primary drive output to the rear wheel, and to control back-torque transfer from the rear wheel to the primary drive output by frictional clutch plate slippage;
a dynamic adjuster for altering the back-torque transfer; and
a controller coupled to the dynamic adjuster, whereby a rider of the motorcycle may control the back-torque transfer while riding the motorcycle.

3. The motorcycle of claim 1 wherein:
the secondary output shaft rides is coupled to the swingarm by bearings which are coaxial with the swingarm pivot.

* * * * *

UNITED STATES PATENT AND TRADEMARK OFFICE
CERTIFICATE OF CORRECTION

PATENT NO. : 7,104,375 B2
APPLICATION NO. : 10/633296
DATED : September 12, 2006
INVENTOR(S) : Michael Czysz Page 1 of 1

It is certified that error appears in the above-identified patent and that said Letters Patent is hereby corrected as shown below:

Claim 1 from col. 6, line 26 and on should read:
--a final output shaft coaxial with a swingarm pivot at which the swingarm is coupled to-- one of-- the frame-- and the engine--;
a rear wheel rotatably coupled to the swingarm, and coupled to be driven by torque from the final output shaft; and
a slipper clutch coupling the primary drive output to the final output shaft to provide spragged torque transfer from the primary drive output to the rear wheel, and to control back-torque transfer from the rear wheel to the primary drive output by frictional clutch plate slippage--, the slipper clutch including a slipper clutch shaft which is parallel with and not coaxial with the final output shaft and perpendicular to the primary output shaft, the slipper clutch shaft being engaged by gears to drive the final output shaft--.--

Signed and Sealed this

Twenty-seventh Day of February, 2007

JON W. DUDAS
*Director of the United States Patent and Trademark Office*